United States Patent
Mitsutani

(10) Patent No.: US 7,941,254 B2
(45) Date of Patent: May 10, 2011

(54) HYBRID VEHICLE CONTROL DEVICE

(75) Inventor: Noritake Mitsutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/740,033

(22) PCT Filed: Nov. 10, 2008

(86) PCT No.: PCT/JP2008/070415
§ 371 (c)(1),
(2), (4) Date: Apr. 27, 2010

(87) PCT Pub. No.: WO2009/063826
PCT Pub. Date: May 22, 2009

(65) Prior Publication Data
US 2010/0256851 A1    Oct. 7, 2010

(30) Foreign Application Priority Data
Nov. 12, 2007    (JP) .................. 2007-293184

(51) Int. Cl.
*B60L 11/00*    (2006.01)
*B60W 20/00*    (2006.01)

(52) U.S. Cl. ..................... 701/22; 180/65.285

(58) Field of Classification Search .......... 701/22, 701/29; 180/65.285, 65.31; 307/9.1, 10.2; 903/902
See application file for complete search history.

(56) References Cited

U.S. PATENT DOCUMENTS

| | | | |
|---|---|---|---|
| 7,626,395 B2* | 12/2009 | Kanamori | 324/503 |
| 2004/0055304 A1 | 3/2004 | Shimizu et al. | |
| 2004/0084234 A1* | 5/2004 | Yatabe et al. | 180/65.2 |
| 2006/0058932 A1* | 3/2006 | Garg et al. | 701/29 |

FOREIGN PATENT DOCUMENTS

| | | |
|---|---|---|
| JP | A 2000-253512 | 9/2000 |
| JP | A 2004-096956 | 3/2004 |
| JP | A 2005-073447 | 3/2005 |

OTHER PUBLICATIONS

International Preliminary Report on Patentability issued in corresponding International Application No. PCT/JP2008/070415, issued Jun. 29, 2010. (with English-language translation).
International Search Report issued in corresponding International Application No. PCT/JP2008/070415, mailed Feb. 3, 2009.

* cited by examiner

*Primary Examiner* — Yonel Beaulieu
(74) *Attorney, Agent, or Firm* — Oliff & Berridge, PLC

(57) ABSTRACT

A hybrid vehicle control unit performs diagnosis of a power generator using a target number of diagnoses during a trip period that extends from an ON state to an OFF state of an ignition key. For this, the control unit judges whether electricity is generated by the power generator from time to time. If no power is generated, it is judged whether the number of diagnoses which have been performed reaches the target number of diagnoses. If the target number of diagnoses is not reached, it is judged whether a diagnosis start condition appropriate for the diagnosis is satisfied. If yes, a gate arranged between a first inverter for controlling drive of the power generator and a power source is opened so that they are electrically connected. While keeping this state, a zero-torque control is executed to execute a diagnosis regarding the power generator.

5 Claims, 3 Drawing Sheets

HYBRID VEHICLE CONTROL DEVICE

TECHNICAL FIELD

The present invention relates to a hybrid vehicle control device which controls a hybrid vehicle having an internal combustion engine, a power generator which generates electric power by mechanical power of the internal combustion engine, a first inverter which controls the power generator, a motor which drives a wheel, and a second inverter which controls the motor.

BACKGROUND ART

In recent years, a hybrid vehicle (hereinafter also referred to as "HV") which drives a wheel with a motor and which generates electric power by a power generator and an engine is known. In such an HV, when the wheel is driven by the motor, the power generator rotates by co-rotation and electric power is generated due to the rotation. In this case, there has been a problem in that a part of the driving force which is output from the motor is consumed in the power generator, and the efficiency is consequently reduced. In order to prevent power generation by the power generator during the co-rotation, it is possible to apply a current to a coil of the power generator. However, in this configuration, there is a problem in that the power consumption is increased.

In order to solve this problem, a technique is known in which, in an HV having two motors, when one of the motors is driven, the other motor is cut off from the power supply (for example, JP 2000-253512 A). By cutting off the motor which is not being used from the power supply, unintentional power generation or the like is prevented and the drive efficiency can be improved.

DISCLOSURE OF INVENTION

Problem to be Solved

However, in the above-described configuration, there may be cases where the diagnosis (hereinafter also referred to as "diag.") may not be possible at an appropriate timing. More specifically, in recent years, mounting of a diag. function has been proposed wherein failure/non-failure of various electronic devices and sensors mounted in a vehicle are self-diagnosed. In such diag., a trip period, which is a running period from switching ON of the ignition key to switching OFF of the ignition key, is considered as one segment, and failure/non-failure of the electronic devices are diagnosed at least once for each trip.

In such a diag. function, the failure/non-failure of the power generator and the inverter which drives the power generator are also diagnosed. In the case of the power generator and the first inverter, for example, the torque characteristic and demagnetization characteristic of the power generator and the electric connection states of the power generator and the inverter are set as diag. items to be diagnosed. The final failure/non-failure judgment of the power generator is executed based on the diagnosis results of these diag. items.

Here, these diag. items are items which can only be detected in the state where the inverter which drives and controls the power generator is driven. Therefore, if the configuration of related art in which the power generator and the power supply are electrically cut off during electric running in which the wheel is driven with the motor is employed, there may not be an opportunity for the power generator to be driven during one trip period, depending on the running state and the remaining amount of stored electricity of the power supply. As a result, in such a case, the above-described diag. item cannot be detected even once. In particular, in a plug-in-type HV which enables external charging, the number of opportunities for the power generation by the power generator tends to be low, and in many cases, the opportunity for diag. (self diagnosis) of the power generator and the inverter cannot be obtained. As a result, there has been a problem in that early detection of failure is difficult.

In consideration of this, an advantage of the present invention is that a hybrid vehicle control device is provided which can detect a failure at an early stage.

Means for Solving the Problem

In order to achieve at least the advantage described above, according to one aspect of the present invention, there is provided a hybrid vehicle control device which controls a hybrid vehicle comprising an internal combustion engine, a power generator which generates electric power by mechanical power of the internal combustion engine, a first inverter which controls the power generator, a motor which drives a wheel, and a second inverter which controls the motor, the hybrid vehicle control device comprising a detecting unit which, during driving of the first inverter, detects a value which is defined in advance and which is necessary for a failure/non-failure diagnosis of at least one of the power generator and the first inverter, and a control unit which controls the driving of the first inverter and which diagnoses failure/non-failure of at least one of the power generator and the first inverter based on a detection result by the detecting unit, wherein the control unit stops driving of the first inverter when the control unit judges that the failure/non-failure diagnosis is not necessary during electric running in which the wheel is driven with the motor, and the control unit instructs to drive the first inverter until the detection by the detecting unit is completed even during the electric running when the control unit judges that the failure/non-failure diagnosis is necessary.

According to another aspect of the present invention, it is preferable that the control device further comprises a storage unit which stores a diagnosis result by the control unit separately for each trip period which is a running period from switching ON of an ignition key to switching OFT of the ignition switch, wherein, when the control unit judges that a number of diagnoses has not reached a target number of diagnoses based on a diagnosis result stored in the storage unit, the control unit judges that the failure/non-failure diagnosis is necessary and instructs to drive of the first inverter even during electric running. According to another aspect of the present invention, it is preferable that, in the control device, the control unit drives and controls the first inverter during execution of the detection by the detecting unit so that the power generator is zero-torque controlled.

According to another aspect of the present invention, it is preferable that the control device further comprises a rotational speed detecting unit which detects the rotational speed of the power generator by co-rotation, wherein the control unit instructs to drive the first inverter to execute the detection by the detecting unit when the number of diagnoses has not reached a target number and the rotational speed detected by the rotational speed detecting unit has reached a rotational speed which is appropriate for diagnosis of the power generator.

According to anther aspect of the present invention, it is preferable that, in the control device, the power supply can be internally charged by the internal combustion engine and the power generator and can be externally charged by an external power supply.

Advantages

According to various aspects of the present invention, the value detection by the detecting unit is forcefully executed when necessary. Because of this, regardless of the running state, the diagnoses for the target number of diagnoses are executed. As a result, failure can be detected at an early stage.

EXPLANATION OF REFERENCE NUMERALS

10 MOTOR; 12 POWER GENERATOR; 13 GATE; 14 ENGINE; 16 POWER DIVIDING MECHANISM; 18 DECELERATOR; 20 WHEEL; 22 SECOND INVERTER; 24 FIRST INVERTER; 26 BATTERY; 28 ROTATION SENSOR; 30 CURRENT SENSOR; 32 CONTROL UNIT; 34 STORAGE UNIT

BEST MODE FOR CARRYING OUT THE INVENTION

Figure 1:
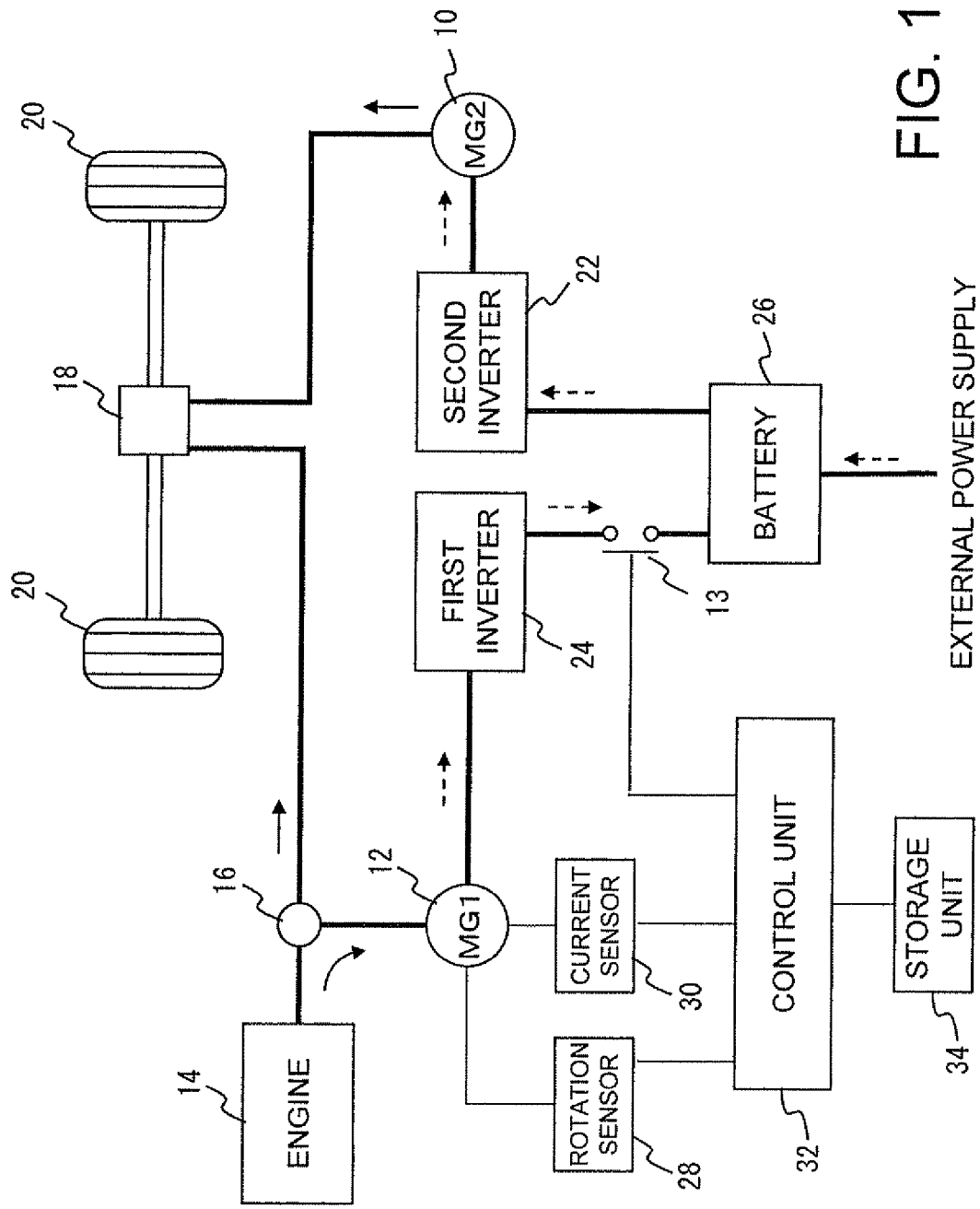
FIG. 1 is a structural diagram of a driving mechanism of an HV according to a preferred embodiment of the present invention.

A preferred embodiment of the present invention will now be described in detail with reference to the drawings. FIG. 1 is a structural diagram of a driving mechanism of an HV according to a preferred embodiment of the present invention. In FIG. 1, arrows of solid lines represent the flow of mechanical power and arrows of dashed lines represent the flow of electric power.

The HV is provided with a motor 10 and a power generator 12. The motor 10 is primarily used as a mechanical power source for driving the wheel. The motor 10 is mechanically connected to a wheel 20 through a decelerator 18 and is electrically connected to a battery 26, which is a power supply, through a second inverter 22. When the HV is electrically run, the electric power stored in the battery 26 is converted from DC to AC by the second inverter 22 and supplied to the motor 10. Upon reception of the electric power, the motor 10 functions as a motor and drives the wheel 20. When the HV is decelerated, the motor 10 which follows the wheel 20 functions as a generator and executes regenerative power generation. The electric power obtained by the regenerative power generation is transmitted to and stored in the battery 26 through the second inverter 22.

The power generator 12 is mechanically connected to an engine through a mechanical power dividing mechanism 16 comprising a planet gear or the like and is electrically connected to the battery through a first inverter 24. The engine 14 is mechanically connected to both the power generator 12 and the wheel 20 through the mechanical power dividing mechanism 16. When the amount of stored electricity in the battery 26 is reduced or when it is judged that the wheel driving by the engine 14 is appropriate, the engine 14 is driven. The mechanical power which is output from the engine 14 is divided into appropriate ratios every time and transmitted to the wheel 20 and the power generator 12. In this process, the power generator 12 converts the mechanical power supplied from the engine 14 to the electric power (power generation). The electric power obtained by the power generation is transmitted to and stored in the battery 26 through the first inverter 24.

A gate 13 comprising a relay or the like is provided between the first inverter 24 and the battery 26. The gate 13 is controlled to be opened and closed by a control unit 32, to be described later, and the control unit 32 controls the driving of the first inverter 24 by opening and closing the gate 13. In general, the control unit 32 closes the gate 13 during the electric running so that the first inverter 24 is electrically cut off from the battery 26 (and consequently, the power generator 12 is electrically cut off from the battery 26) and the driving of the first inverter 24 is stopped. When a particular condition is satisfied, the gate 13 is opened and the first inverter 24 is driven even during the electric running. This case will be described later in detail.

The gate 13 is provided in order to improve the efficiency of the HV. Specifically, as has already been described, during the electric running, the wheel 20 is driven by receiving mechanical power from the motor 10. With the driving of the wheel 20, a rotation of the power generator, which is also called a co-rotation, is caused. When the power generator 12 generates electric power by the co-rotation, a part of the mechanical power which is output from the motor 10 is wastefully consumed by the power generator 12, and there is a problem in that the efficiency is reduced. In order to prevent the power generation of the power generator 12 by the co-rotation, a configuration may be considered in which a current is applied to a coil of the power generator 12. However, this configuration would wastefully consume the electric power, resulting in a reduction in the efficiency. Therefore, in the present embodiment, the gate 13 is closed during the electric running so that the electric connection between the first inverter 24 and the battery 26 (and consequently, between the power generator 12 and the battery 26) is cut off and the driving of the first inverter 24 is stopped.

The power generator 12 is provided with a rotation sensor 28 and a current sensor 30. These sensors are used for execution of the monitoring for diag. as will be described later in detail. The rotation sensor 28 detects the rotational speed of the power generator 12. The detected rotational speed is output to the control unit 32. The current sensor 30 is a sensor which detects a current value which is output from the power generator 12. The control unit 32 judges the torque characteristic, the demagnetization characteristic, and the system characteristic of the power generator 12 based on the detected current value.

The battery 26 functions as a power supply which supplies electric power to the motor 10 or the like. The battery 26 can be internally charged by the power generation by the power generator 12 and the regenerative power generation by the motor 10, and can also be externally charged by being electrically connected to an external power supply (for example, a power supply provided in a gas station). In other words, the HV of the present invention is of a plug-in type which can be externally charged.

The control unit 32 continuously monitors the amount of stored electricity in the battery 26, and instructs execution of the power generation by the power generator 12 and the engine 14 when the amount of stored electricity becomes less than a power generation start reference value which is defined in advance. The power generation start reference value is set in many cases to be a lower value in the case of the plug-in type compared to the non-plug-in type. More specifically, because the HV of the non-plug-in type can only be internally charged, the power generation operation must be started at a relatively early stage, or otherwise, the electric power consumption may exceed the amount of stored electricity. Because of this, in the non-plug-in type HV, if the full amount of stored electricity is 100%, the power generation start reference value is defined to be a relatively high value (for example, 40%~50%), and the power generation by the power generator 12 is started when the amount of stored electricity becomes less than or equal to this value. In the case of the plug-in type HV, on the other hand, the HV can not only internally charged, but also externally charged, and thus even if a relatively large amount of electric power is consumed in the vehicle running, the consumed electric power can be recovered through external charging. Therefore, the power generation start reference value may be set at a lower value compared to the power generation start reference value for the non-plug-in type HV (for example, 20%~30%), and no problem occurs. By setting the power generation start reference value to a relatively low value, it is possible to reduce the number of executions of the power generation (the number of times the engine is driven), and consequently improve the fuel efficiency.

Figure 2A:
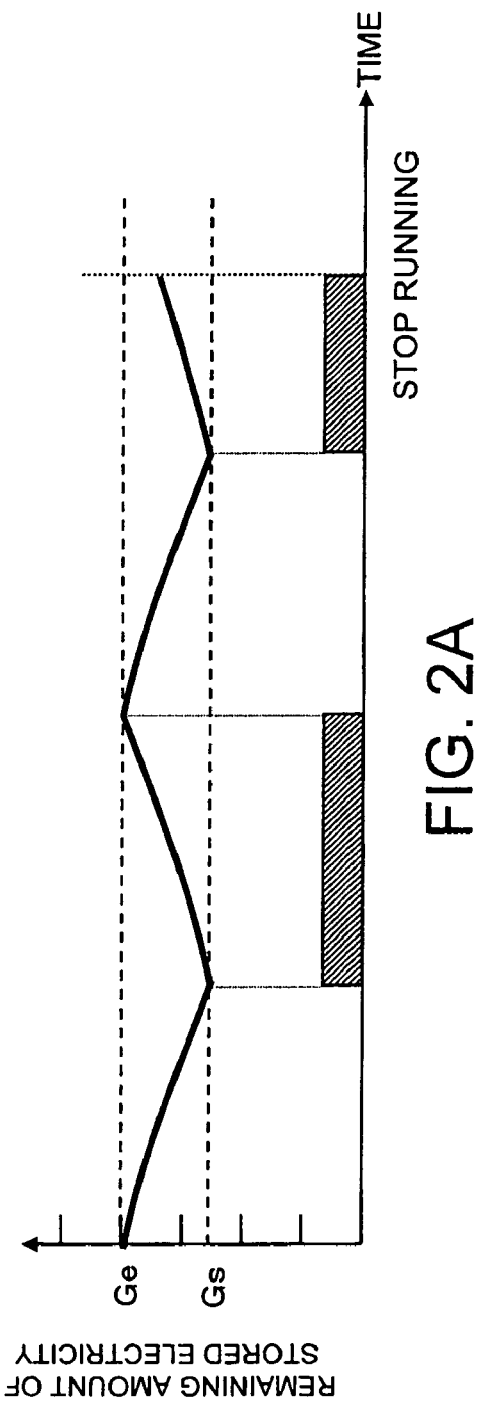
FIG. 2A is a diagram showing an example of a change of an amount of stored electricity of a battery in a non-plug-in-type device.
Figure 2B:
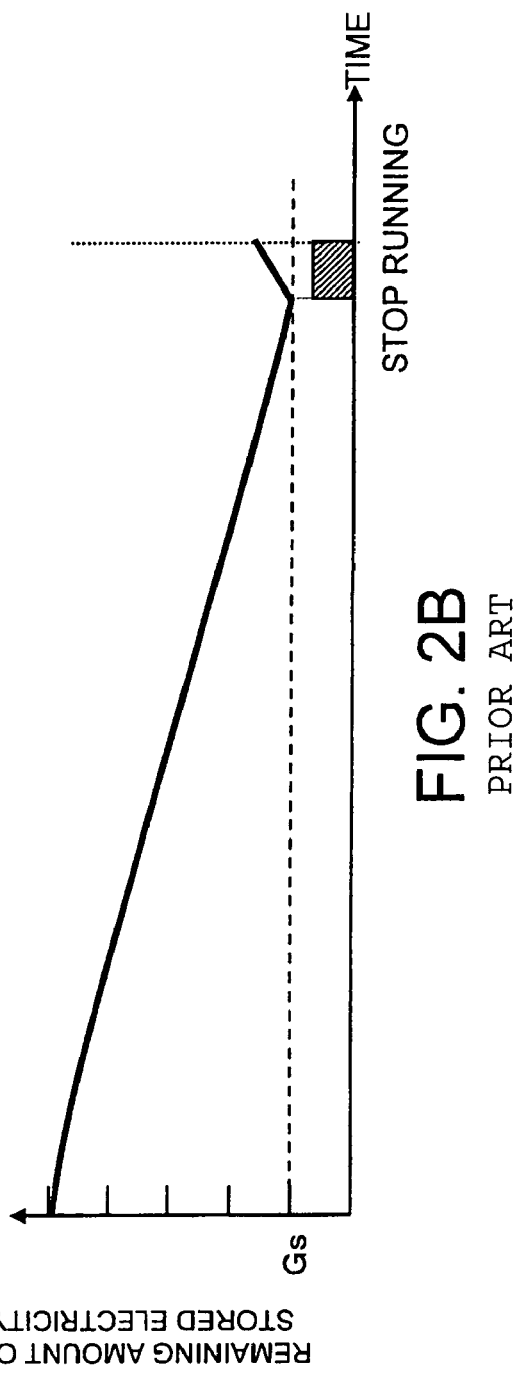
FIG. 2B is a diagram showing an example of a change of an amount of stored electricity of a battery in a plug-in-type device.

This will be described with reference FIG. 2. FIG. 2A shows a change of the amount of stored electricity of the battery 26 in a non-plug-in type HV and FIG. 2B shows a change of the amount of stored electricity of the battery 26 in the plug-in type HV. In FIG. 2, the horizontal axis represents elapsed time and the vertical axis represents the amount of stored electricity in the battery 26. In addition, a rectangular section shown with the hatching lines represents a period in which the power generation by the power generator 12 is executed.

In the non-plug-in type HV, when the HV is electrically run, the amount of stored electricity in the battery is gradually reduced as time elapses. In this case, because a power generation start reference value Gs is set at a relatively high value, the amount of stored electricity in the battery is reduced to the power generation start reference value Gs at an early stage. When the amount of stored electricity in the battery becomes less than or equal to the power generation start reference value Gs, the control unit 32 drives the engine 14 and instructs execution of the power generation by the power generator 12. When the amount of stored electricity in the battery is increased, by the power generation, to a power generation stop reference value Ge which is defined in advance, the power generation operation is stopped. If the electric running is continued, the power generation, that is, driving of the engine, is executed whenever the amount of stored electricity in the battery is reduced to the power generation start reference value Gs, and gasoline is consumed. As a result, the fuel consumption is increased.

In the case of the plug-in type HV, with the electric running, the amount of stored electricity in the battery is similarly gradually reduced as time elapses. However, in the case of the plug-in type HV, the power generation start reference value Gs is set at a relatively low value. Because of this, the electric running can be continued without executing the power generation for a longer period of time (for a longer distance). As a result, depending on the running distance for one time, the electric running may be continued without generating power even once. Even if the HV is run and stopped or parked without the power generation, through the external charging, the amount of stored electricity in the battery can be increased without driving the engine, and the re-running of the HV can be executed without a problem. As a result, the amount of gasoline consumption can be reduced compared to the non-plug-in type HV, the fuel efficiency, can be improved, and the amount of discharge of harmful gases such as $CO_2$ can be reduced.

With reference again to FIG. 1, a structure of the HV will now be described. The control unit 32 controls various electronic devices of the HV, for example, driving of the inverter or the like, and is generally called an ECU (Electronic Control Unit). Although the control unit 32 is electrically connected to the inverters 22 and 24 which are to be controlled and the amount-of-stored-electricity sensor (not shown) provided in the battery 26, the electrical connection lines for these connections are not shown in FIG. 1.

The control unit 32 also executes a diag. (self diagnosis) process of the power generator 12. Here, the diag. process refers to a process of self diagnosis to diagnose whether or not the various electronic devices and sensors mounted on the vehicle are functional. By executing the diag. process, failure of the various electronic devices can be found at early stage. In addition, in the diag. process, a trip period which is a running period from switching ON of the ignition key to the switching OFF of the ignition key is considered as one diagnosis period. The control unit 32 monitors the state of the diagnosis target device for a predetermined target number of times (once or more) for each trip period, and diagnoses the failure/non-failure of the diagnosis target device based on the monitoring result. The obtained diagnosis result is stored in a storage unit 34, separately for each trip period. When the diagnosis result is "abnormal", the control unit 32 presents the content of the abnormality to the user by, for example, switching ON an alarm lamp provided in the vehicle.

The items to be diagnosed in the diag. process are defined in advance for each electronic device as a diag. item. For example, in the case of the power generator 12, the torque characteristic, the demagnetization characteristic, and the system characteristic are set as the diag. items. The torque characteristic represents a ratio of the torque with respect to the rotational speed. The demagnetization characteristic is a characteristic related to the demagnetization due to a temperature increase by eddy current loss caused by rotation of the rotor or an opposite magnetic field generated by the coil. The system characteristic is a characteristic related to the electrical structure of the electric system comprising the battery 26, first inverter 24, and power generator 12 which are connected to each other, and, for example, presence/absence of a disconnected line is diagnosed. The torque characteristic, demagnetization characteristic, and the system characteristic are diagnosed based on the current value flowing in the power generator 12, which is detected by the current sensor 30. Although only a single current sensor 30 is shown in FIG. 1, in reality, the type (phase) of current detected for each characteristic differs from each other, and separate current sensors 30 are provided for these characteristics.

When the rotational speed is excessively high, the output torque is not stable. Therefore, it is desirable that the torque characteristic be diagnosed based on a current value which is detected in a state where the rotational speed of the power generator 12 is not excessively high (for example, a state of 13300 rpm or less). In the case of the demagnetization characteristic, on the other hand, the diagnosis is not stable when the rotational speed is excessively low. Therefore, it is desirable that the demagnetization characteristic be diagnosed based on a current value detected in a state where the rotational speed is not excessively low (for example, a state of 3000 rpm or greater). The system characteristic can be stably diagnosed regardless of the rotational speed.

As has already been described, the number of diag. processes is defined in advance for each trip period. For example, when the target number is defined as once, the torque characteristic, demagnetization characteristic, and system characteristic of the power generator 12 must be diagnosed at least once during one trip period. However, in the structure of the related art, in some cases, the diag. process for the power generator 12 cannot be executed during one trip period, depending on the running status of the HV.

More specifically, the diag. items which are set for the power generator 12 are items that can only be diagnosed in the state where the first inverter 24 is driven (power generator 12 is generating electric power), that is, the state where the gate 13 is opened. However, intentional power generation by the power generator 12 is not executed until the amount of stored electricity in the battery 26 reaches the power generation start reference value Gs. In addition, because the unintentional power generation due to the co-rotation results in reduction of efficiency, the gate 13 is in a closed state during the electric running and the driving of the first inverter 24 is stopped. In other words, when the amount of stored electricity in the battery does not reach a value which is less than or equal to the power generation start reference value Gs during one trip period, there may be cases where the diag. process cannot be applied even once. Such a problem tends to more frequently occur in the plug-in type HV in which the power generation start reference value Gs is set to a lower value.

In consideration of this, in the present embodiment, in order to solve such a problem, the necessity of execution of the diag. process is judged based on a diagnosis result stored in the storage unit 34, and when it is judged that the diag. process is necessary, the gate 13 is opened and an opportunity to execute the diag. process is forcefully created. A flow of this process will now be described with reference to FIG. 3.

Figure 3:
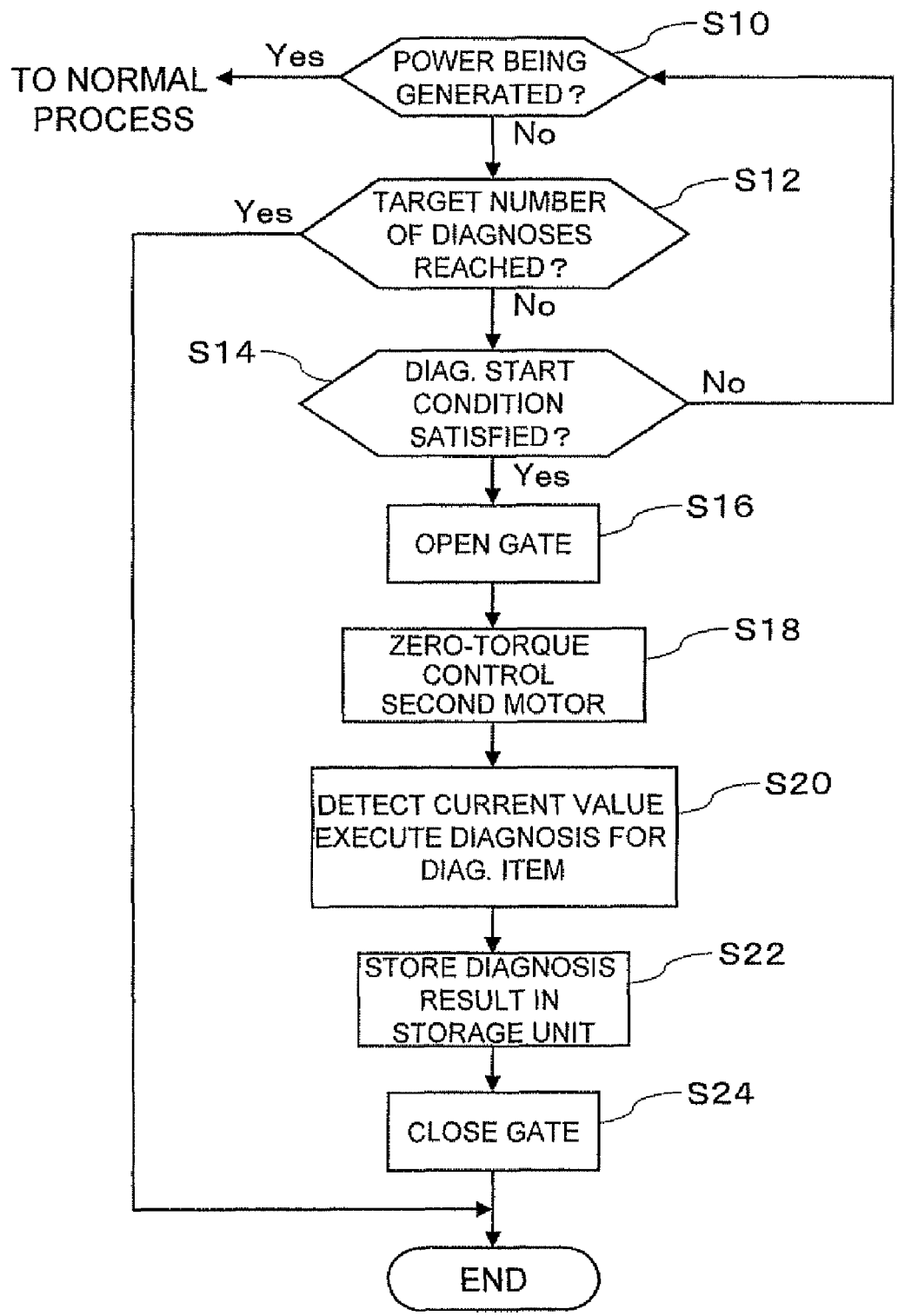
FIG. 3 is a flowchart showing a flow of a diag. process.

FIG. 3 is a flowchart showing a flow of a diag. process executed by the control unit 32. The control unit 32 first judges whether or not the intentional power generation by the power generator 12 is being executed (S10). When the power generation is being executed, a process similar to the related art is executed. In other words, in this case, because the power generation by the power generator 12 is executed by receiving mechanical power from the engine 14, the current value of the power generator 12 is monitored and the diagnoses for the diag. items are executed based on the obtained monitoring result. In the case of power generation, the gate 13 provided between the power generator 12 and the first inverter 24 is open, and thus the monitoring of the current value can be executed without a problem.

On the other hand, when it is judged that power generation is not being executed, the gate 13 is closed in this state and the driving of the first inverter 24 is stopped, and thus the current value of the power generator 12 cannot be monitored. In this case, the control unit 32 then judges whether or not the number of diag. processes in this trip period has reached a target number of diagnoses (S12). When the target number of diagnoses is reached, another round of the diag. process is not necessary. Therefore, the process is completed without opening the gate or the like.

When the number of diag. processes is less than the target number, on the other hand, the control unit 32 judges whether or not a predetermined diag. start condition is satisfied (S14). The diag. start condition is a condition showing whether or not the power generator is in such a state where the diag. items can be stably diagnosed. More specifically, as is described above, the torque characteristic is desirably diagnosed based on a current value detected in a state where the rotational speed is not excessively high and the demagnetization characteristic is desirably diagnosed based on a current value detected in a state where the rotational speed is not excessively low. Thus, in the present embodiment, as the diag. start condition, a condition of 3000 rpm$\leq$V$\leq$13300 rpm, wherein V represents a rotational speed of the power generator due to co-rotation, is set as the diag. start condition.

When the diag. start condition is not satisfied, the process returns to step S10, and the steps S10~S14 are repeated until the diag. start condition is satisfied. On the other hand, when the diag. start condition is satisfied, that is, when the rotational speed V of the power generator 12 satisfies the condition of 3000 rpm$\leq$V$\leq$13300 rpm, the control unit 32 opens the gate 13 provided between the power generator 12 and the first inverter 24 (S16). With the gate 13 opened, the first inverter 24 and the battery 26, and consequently the power generator 12 and the battery 26, are electrically connected. With this connection, the power generator 12 functions as a power generator, and the above-described diag. items can be detected. In order to prevent reduction of the efficiency due to the power generator 12 consuming a part of the mechanical power from the motor 10, the power generator 12 is zero-torque controlled (S18). With such a configuration, the diag. items can be detected while suppressing the reduction in efficiency.

The control unit 32, while applying the zero-torque control, judges the quality of the torque characteristic, demagnetization characteristic, and system characteristic of the power generator 12 based on the detected value at the current sensor 30 which is obtained in this process (S20). The obtained judgment result is stored in the storage unit 34 as a diagnosis result of this trip (S22). The control unit 32 then closes the gate 13, to cut off the electrical connection between the power generator 12 and the battery 26. After the gate is closed, the process returns to S12, and similar processes are repeated until diagnosis is executed for a defined target number of diagnoses.

In the present embodiment, the diag. start condition is set to 3000 rpm$\leq$V$\leq$13300 rpm, in order to diagnose all of the torque characteristic, demagnetization characteristic, and system characteristic at once with an opening of the gate. Alternatively, the diagnoses of the three characteristics may be divided into a plurality of times. For example, as long as the rotational speed of the power generator 12 is less than or equal to 13300 rpm, the gate 13 may be opened even when the rotational speed is less than 3000, and the diagnoses of only the torque characteristic and the system characteristic may be executed. After the diagnoses of the torque characteristic and the system characteristic are completed, the gate 13 may be closed. Then, at a later time, when the rotational speed of the power generator exceeds 3000 rpm, the gate 13 may be opened again and the diagnosis of only the demagnetization characteristic which is not yet diagnosed may be executed. In addition, the three diagnosis items (torque characteristic, demagnetization characteristic, and system characteristic) exemplified herein are only examples, and other values may be set as the diagnosis items, if the value allows diagnosis of the performance of the power generator 12 by driving the first inverter 24. Moreover, the failure/non-failure of the first inverter 24 may be diagnosed using an item which is strongly related to the first inverter 24, such as the system characteristic.

As is clear from the above description, according to the present embodiment, an opportunity for diagnosis of the power generator 12 is forcefully provided even during the electric running. With this configuration, the power generator 12 and the first inverter 24 can be diagnosed regardless of the running status and even for the plug-in type HV in which the time of electric running tends to be long, and malfunctioning or the like of the power generator 12 or the like can be known at an early stage. In addition, during the diagnosis, the power generator 12 is zero-torque controlled. With this configuration, the reduction in efficiency due to the diagnosis can be suppressed.

The invention claimed is:

1. A hybrid vehicle control device which controls a hybrid vehicle comprising an internal combustion engine, a power generator which generates electric power by mechanical power of the internal combustion engine, a first inverter which controls the power generator, a motor which drives a wheel, and a second inverter which controls the motor, the hybrid vehicle control device comprising:
  a detecting unit which detects, during driving of the first inverter, a value which is defined in advance and which is necessary for a failure/non-failure diagnosis of at least one of the power generator and the first inverter, and
  a control unit which controls the driving of the first inverter and which diagnoses failure/non-failure of at least one of the power generator and the first inverter based on a detection result by the detecting unit, wherein
  the control unit stops driving of the first inverter when the control unit judges that the failure/non-failure diagnosis is not necessary during electric running in which the wheel is driven with the motor, and the control unit instructs to drive the first inverter until the detection by the detecting unit is completed even during the electric running when the control unit judges that the failure/non-failure diagnosis is necessary.

2. The hybrid vehicle control device according to claim 1, further comprising:
  a storage unit which stores a diagnosis result by the control unit separately for each trip period which is a running period from switching ON of an ignition switch to switching OFF of the ignition switch, wherein
  when the control unit judges that a number of diagnoses has not reached a target number of diagnoses based on a diagnosis result stored in the storage unit, the control unit judges that the failure/non-failure diagnosis is necessary and instructs to drive the first inverter even during the electric running.

3. The hybrid vehicle control device according to claim 2, wherein
  the control unit drives and controls the first inverter during execution of the detection by the detecting unit so that the power generator is zero-torque controlled.

4. The hybrid vehicle control device according to claim 2, further comprising:
  a rotational speed detecting unit which detects the rotational speed of the power generator by co-rotation, wherein
  the control unit instructs to drive the first inverter to execute the detection by the detecting unit when the number of diagnoses has not reached the target number and the rotational speed detected by the rotational speed detecting unit has reached a rotational speed which is appropriate for diagnosis of the power generator.

5. The hybrid vehicle control device according to claim 1, wherein
  the power supply can be internally charged by the internal combustion engine and the power generator and can be externally charged by an external power supply.

* * * * *